(12) United States Patent
Simoncelli

(10) Patent No.: US 9,104,634 B2
(45) Date of Patent: Aug. 11, 2015

(54) USAGE OF SNAPSHOTS PREPARED BY A DIFFERENT HOST

(71) Applicant: Federico Simoncelli, Fano (IT)

(72) Inventor: Federico Simoncelli, Fano (IT)

(73) Assignee: Red Hat Israel, Ltd., Raanana (IL)

( * ) Notice: Subject to any disclaimer, the term of this patent is extended or adjusted under 35 U.S.C. 154(b) by 267 days.

(21) Appl. No.: 13/690,638

(22) Filed: Nov. 30, 2012

(65) Prior Publication Data
US 2014/0156955 A1    Jun. 5, 2014

(51) Int. Cl.
*G06F 12/00* (2006.01)
*G06F 12/16* (2006.01)
*G06F 9/455* (2006.01)
*G06F 9/50* (2006.01)
*G06F 11/20* (2006.01)
*G06F 11/14* (2006.01)

(52) U.S. Cl.
CPC ............ *G06F 12/16* (2013.01); *G06F 9/45558* (2013.01); *G06F 9/5077* (2013.01); *G06F 11/1456* (2013.01); *G06F 11/2074* (2013.01); *G06F 2009/4557* (2013.01)

(58) Field of Classification Search
None
See application file for complete search history.

(56) References Cited

U.S. PATENT DOCUMENTS

| 6,311,193 | B1 * | 10/2001 | Sekido | 1/1 |
| 8,566,542 | B1 * | 10/2013 | Wang et al. | 711/162 |
| 2011/0010515 | A1 * | 1/2011 | Ranade | 711/162 |
| 2013/0055206 | A1 * | 2/2013 | Dudek et al. | 717/124 |
| 2014/0156955 | A1 * | 6/2014 | Simoncelli | 711/162 |

* cited by examiner

*Primary Examiner* — Brian Peugh
(74) *Attorney, Agent, or Firm* — Lowenstein Sandler LLP

(57) ABSTRACT

A system and method are disclosed for preparing and using snapshots in a virtualized environment. In accordance with one example, a first computer system prepares, in an area of a storage device, a snapshot of a virtual disk of a virtual machine that is hosted by a second computer system. The first computer system then provides to the second computer system a reference to the prepared snapshot.

20 Claims, 4 Drawing Sheets

USAGE OF SNAPSHOTS PREPARED BY A DIFFERENT HOST

TECHNICAL FIELD

This disclosure relates to computer systems, and more particularly, to the usage of snapshots in virtualized computer systems.

BACKGROUND

A virtual machine (VM) is a portion of software that, when executed on appropriate hardware, creates an environment allowing the virtualization of an actual physical computer system (e.g., a server, a mainframe computer, etc.). The actual physical computer system is typically referred to as a "host machine" or a "physical machine," and the operating system of the host machine is typically referred to as the "host operating system."

A virtual machine may function as a self-contained platform, executing its own "guest" operating system and software applications. Typically, software on the host machine known as a "hypervisor" (or a "virtual machine monitor") manages the execution of one or more virtual machines, providing a variety of functions such as virtualizing and allocating resources, context switching among virtual machines, etc.

A virtual machine may comprise one or more "virtual processors," each of which maps, possibly in a many-to-one fashion, to a central processing unit (CPU) of the host machine. Similarly, a virtual machine may comprise one or more "virtual devices," each of which maps to a device of the host machine (e.g., a network interface device, a CD-ROM drive, etc.). For example, a virtual machine may comprise a virtual disk that is mapped to an area of storage (known as a "disk image") of a particular storage device (e.g., a magnetic hard disk, a Universal Serial Bus [USB] solid state drive, a Redundant Array of Independent Disks [RAID] system, a network attached storage [NAS] array, etc.) The hypervisor manages these mappings in a transparent fashion, thereby enabling the guest operating system and applications executing on the virtual machine to interact with the virtual processors and virtual devices as though they were actual physical entities.

BRIEF DESCRIPTION OF THE DRAWINGS

The present disclosure is illustrated by way of example, and not by way of limitation, and can be more fully understood with reference to the following detailed description when considered in connection with the figures in which.

DETAILED DESCRIPTION

Described herein is a system and method by which a computer system may prepare a snapshot of a virtual machine (VM) that is hosted by a different computer system. In accordance with one example, a first computer system prepares, in an area of a storage device, a snapshot of a virtual disk of a VM that is hosted by a second computer system. The first computer system then provides to the second computer system a reference to the prepared snapshot, after which the second computer system can use the prepared snapshot of the VM (e.g., create a new virtual disk from the prepared snapshot, create a clone of the VM from the prepared snapshot, copy the prepared snapshot to another storage device, compute a difference between the prepared snapshot and a given disk image, etc.).

The present disclosure can thus enable a computer system to prepare a snapshot of a VM that is hosted by a different computer system, and enable a computer system that hosts a VM to use a snapshot of the VM that is prepared by a different computer system. In contrast, in virtualized systems of the prior art, a snapshot of a VM is prepared only by the computer system that hosts the VM, and a computer system hosting the VM only uses snapshots of the VM prepared by that computer system. Examples of the present disclosure therefore can provide greater flexibility to multi-node virtualized systems (e.g., virtualized clusters, local area networks linking multiple virtualized computers, etc.). In addition, the present disclosure can potentially improve the performance of multi-node virtualized systems by enabling load balancing of snapshotting across nodes, without requiring shutdown of any virtual machines.

Figure 1:
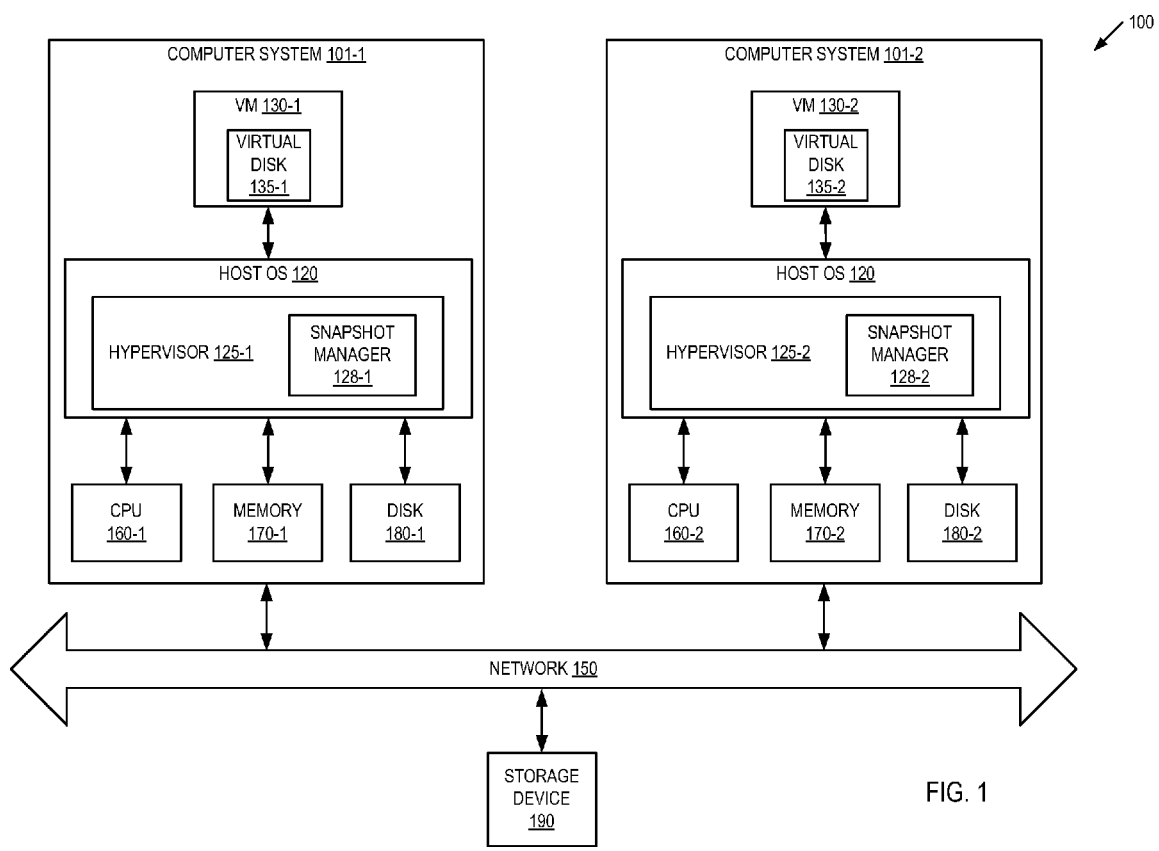
FIG. 1 depicts an illustrative system architecture, in accordance with an example of the present invention.

FIG. 1 depicts an illustrative architecture of a computer system 100, in accordance with some implementations of the present disclosure. It should be noted that other architectures for system 100 are possible, and that the present disclosure should not necessarily be limited to the specific architecture depicted by FIG. 1.

As shown in FIG. 1, system 100 comprises a computer system 101-1, a second computer system 101-2, and a storage device 190 connected via a network 150. Each of computer systems 101-1 and 101-2 may be a server, a mainframe, a workstation, a personal computer (PC), a mobile phone, a palm-sized computing device, etc. The network 150 may be a private network (e.g., a local area network (LAN), a wide area network (WAN), intranet, etc.) or a public network (e.g., the Internet). In some embodiments, computer systems 101-1 and 101-2 may belong to a cluster comprising additional computer systems not depicted in FIG. 1, while in some other embodiments, computer systems 101-1 and 101-2 may be independent systems that are capable of communicating via network 150.

Storage device 190 is a network-attached storage (NAS) that is capable of storing data (e.g., files, virtual disks, snapshots, etc.) and of being written to and read from by computer systems 101-1 and 101-2 via network 150. It should be noted that, for simplicity, a single storage device 190 is depicted in FIG. 1; however, in some other examples system 100 may comprise a plurality of such storage devices.

Each of computer systems 101-1 and 101-2 comprises a central processing unit (CPU) 160, a memory 170, which may include volatile memory devices (e.g., random access memory (RAM)), non-volatile memory devices (e.g., flash memory), and/or other types of memory devices, and a disk 180 (e.g., a magnetic hard disk, a Universal Serial Bus [USB] solid state drive, etc.). It should be noted that the fact that a single CPU is depicted in FIG. 1 for each of computer systems 101-1 and 101-2 is merely illustrative, and that in some other examples one or both of computer systems 101-1 and 101-2 may comprise a plurality of CPUs.

Computer system 101-1 runs a host operating system (OS) 120-1 that manages the hardware resources of the computer system and that provides functions such as interprocess communication, scheduling, virtual memory management, and so forth. In one example, host operating system 120-1 also comprises a hypervisor 125-1, which is software that provides a virtual operating platform for virtual machine 130-1 and that manages the execution of virtual machine 130-1. It should be noted that in some alternative examples, hypervisor 125-1 may be external to host OS 120-1, rather than embedded within host OS 120-1.

Virtual machine 130-1 is a software implementation of a machine that executes programs as though it were an actual physical machine. Virtual machine 130-1 comprises a virtual disk 135-1 that is mapped to a file stored on disk 180-1, as well as a guest operating system (not depicted in FIG. 1) that manages files and programs within the virtual machine. It should be noted that although, for simplicity, FIG. 1 depicts a single virtual disk 135, in some other examples virtual machine 130-1 may comprise a plurality of virtual disks. Similarly, although FIG. 1 depicts a single virtual machine 130 hosted by computer system 101-1, in some other examples computer system 101-1 may host a plurality of virtual machines.

In accordance with one example, hypervisor 125-1 includes a snapshot manager 128-1 that is capable of preparing a snapshot of a virtual disk of a virtual machine (e.g., a file that captures the contents of the virtual disk at a particular point in time), where the virtual machine may be hosted locally on computer system 101-1 (e.g., virtual machine 130-1, etc.) or may be hosted by another system (e.g., virtual machine 130-2 of computer system 101-2, etc.). In one embodiment, snapshot manager 128-1 is also capable of using prepared snapshots (e.g., creating new disk images based on snapshots, copying snapshots from one disk or storage device to another disk or storage device, computing differences between snapshots and disk images, etc.), of providing a reference to a prepared snapshot to another computer system, and of receiving a reference to a prepared snapshot from another computer system. Some operations of snapshot manager 128-1 are described in detail below with respect to the methods of FIGS. 2 and 3.

Computer system 101-2, like computer system 101-1, runs a host operating system (OS) 120-2 that manages the hardware resources of the computer system and that provides functions such as interprocess communication, scheduling, virtual memory management, and so forth. In one example, host operating system 120-2 also comprises a hypervisor 125-2 that provides a virtual operating platform for virtual machine 130-2 and that manages the execution of virtual machine 130-2. It should be noted that in some alternative examples, hypervisor 125-2 may be external to host OS 120-2, rather than embedded within host OS 120-2.

Virtual machine 130-2, like virtual machine 130-1, is a software implementation of a machine that executes programs as though it were an actual physical machine. Virtual machine 130-2 comprises a virtual disk 135-2 that is mapped to a file stored on disk 180-2, as well as a guest operating system (not depicted in FIG. 1) that manages files and programs within the virtual machine. As in virtual machine 130-1 of computer system 101-1, although FIG. 1 depicts a single virtual disk 135, in some other examples virtual machine 130-2 may comprise a plurality of virtual disks. Similarly, although FIG. 1 depicts a single virtual machine 130 hosted by computer system 101-2, in some other examples computer system 101-2 may host a plurality of virtual machines.

In accordance with one example, hypervisor 125-2, like hypervisor 125-1 of computer system 101-1, includes a snapshot manager 128-2 that is capable of preparing a snapshot of a virtual disk of a virtual machine (e.g., a file that captures the entire state of the virtual disk at a particular point in time), where the virtual machine may be hosted locally on computer system 101-2 (e.g., virtual machine 130-2, etc.) or may be hosted by another system (e.g., virtual machine 130-1 of computer system 101-1, etc.). In one embodiment, snapshot manager 128-2 is also capable of using prepared snapshots (e.g., creating new disk images based on snapshots, copying snapshots from one disk or storage device to another disk or storage device, computing differences between snapshots and disk images, etc.), of providing a reference to a prepared snapshot to another computer system, and of receiving a reference to a prepared snapshot from another computer system. Some operations of snapshot manager 128-2 are described in detail below with respect to the methods of FIGS. 2 and 3.

Figure 2:
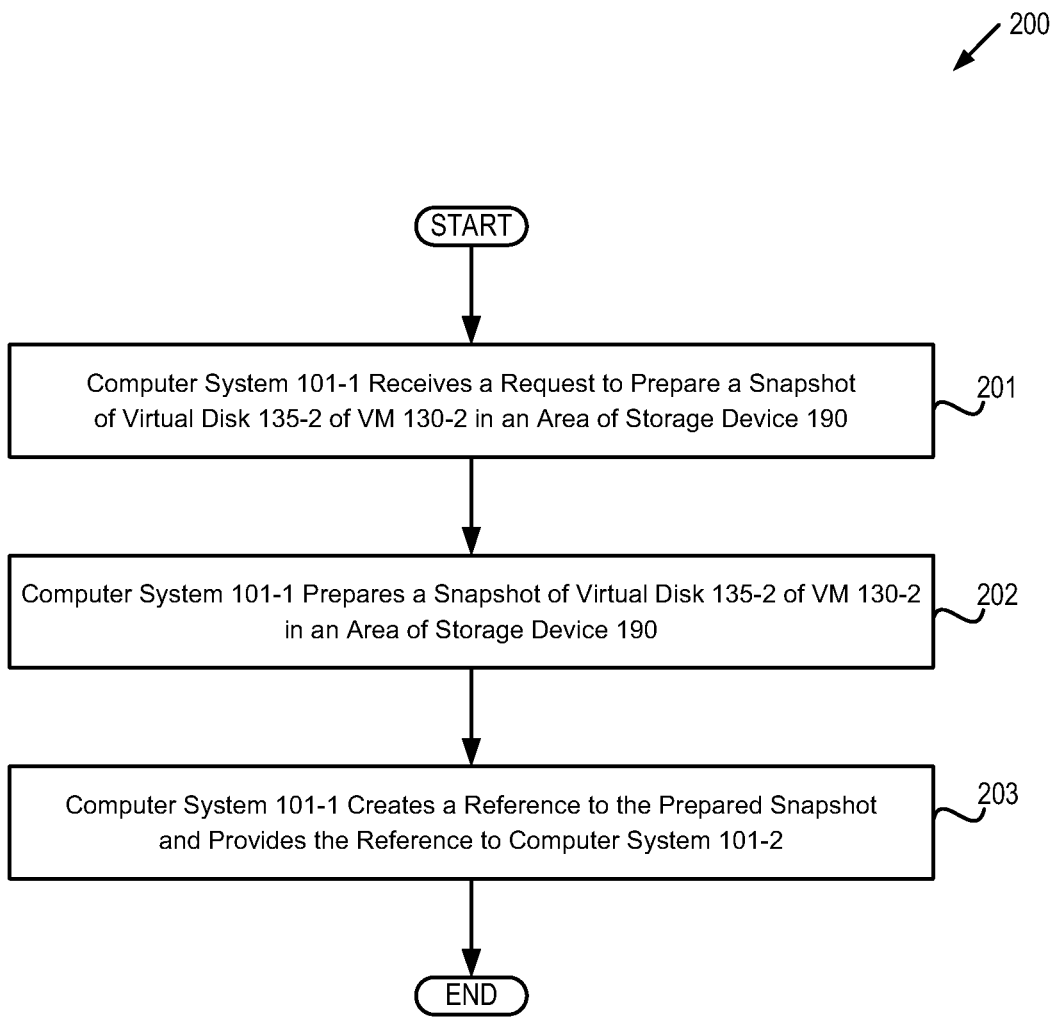
FIG. 2 depicts a flow diagram of one example of a method by which a computer system prepares a snapshot for use by another computer system.

FIG. 2 depicts a flow diagram of one example of a method 200 by which a computer system prepares a snapshot for use by another computer system. The method is performed by processing logic that may comprise hardware (circuitry, dedicated logic, etc.), software (such as is run on a general purpose computer system or a dedicated machine), or a combination of both. In one example, the method is performed by the computer system 101-1 of FIG. 1, while in some other examples, some or all of the method might be performed by another machine.

At block 201, computer system 101-1 receives a request to prepare a snapshot of virtual disk 135-2 of virtual machine 130-2. The request may be issued by an administrator of computer system 100-1, or by an administrator of computer system 100-2, or by an application executing on computer system 100-1, or by an application executing on computer system 100-2, or by a host controller (not depicted in FIG. 1) upon determining that local snapshotting of computer system 101-2 should be offloaded (e.g., when computer system 101-2 is currently over-utilized, etc.), or by some other program (e.g., a system administration-related script that executes on computer system 100-1, a system administration-related script that executes on computer system 100-2, an application that executes on another machine connected to computer system 100-1 [not depicted in FIG. 1] via network 150, etc.).

At block 202, computer system 101-1 prepares a snapshot of virtual disk 135-2 of virtual machine 130-2 in an area of storage device 190. The preparing of the snapshot may comprise allocating the area of storage device 190, as well as initializing the area of storage device 190 (e.g., initializing the area with a header of the snapshot, etc.). In one example, computer system 101-1 was previously designated as a storage pool manager (SPM) and is therefore able to assign or manipulate (e.g., store changes [or "deltas"], etc.) storage areas. In one example, the area of storage device 190 is determined by the storage pool manager (e.g., computer system 101-1, etc.) selecting a free area (e.g., via a logical volume manager [LVM] in block domains, via standard file allocation techniques in a network file system [NFS]-based system, etc.).

In one example, the above area of storage device 190 may belong to a volume (e.g., a logical drive of a file system, etc.), and virtual machine 130-2 may write data from virtual disk 135-2 to a different volume. Similarly, in some examples virtual machine 130-2 may be stored on a different volume than the area of storage device 190 in which the prepared snapshot resides (including, for example, a volume that resides on another storage device not depicted in FIG. 1). In one example, block 202 is performed by snapshot manager 128-1.

At block 203, computer system 101-1 creates a reference (e.g., an address, a volume identifier, etc.) to the prepared snapshot and provides the reference to computer system 101-2. In some embodiments, computer system 101-1 provides the reference by transmitting a message specifying the reference to computer system 101-2 via network 150, while in some other embodiments, the reference may be provided in some other fashion. In one example, block 203 is performed by snapshot manager 128-1.

Figure 3:
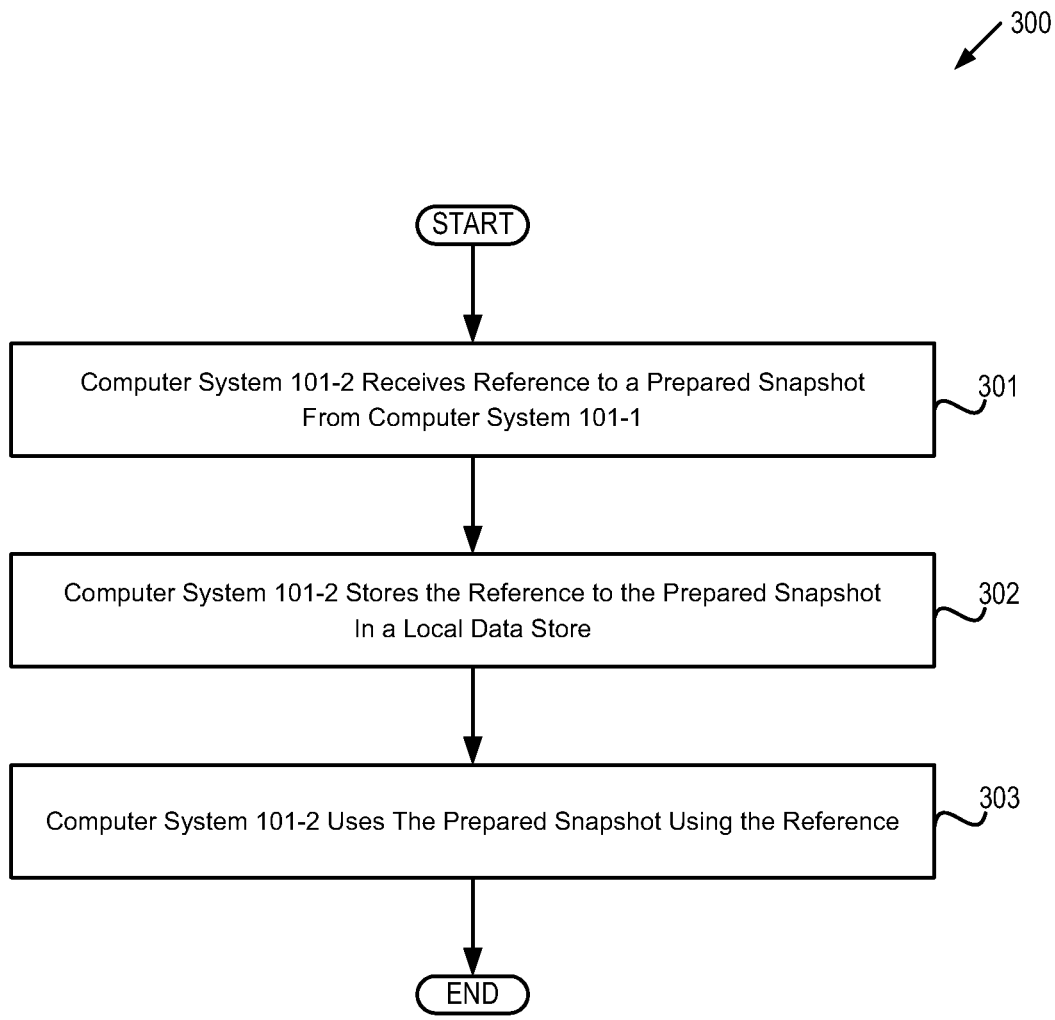
FIG. 3 depicts a flow diagram of one example of a method by which a computer system uses a snapshot prepared by another computer system.

FIG. 3 depicts a flow diagram of one example of a method 300 by which a computer system uses a snapshot prepared by another computer system. The method is performed by processing logic that may comprise hardware (circuitry, dedicated logic, etc.), software (such as is run on a general purpose computer system or a dedicated machine), or a combination of both. In one example, the method is performed by the computer system 101-2 of FIG. 1, while in some other examples, some or all of the method might be performed by another machine.

At block 301, computer system 101-2 receives a reference to a prepared snapshot from computer system 101-1. As described above, in some embodiments the reference may be provided via a message transmitted by computer system 101-1 via network 150, while in some other embodiments, the reference may be received in some other fashion. In one example, block 301 is performed by snapshot manager 128-2.

At block 302, computer system 101-2 stores the reference to the prepared snapshot in a local data store (e.g., a data store maintained in memory 170-2, a data store maintained in disk 180-2, etc.). In one example, prior to storing the reference, computer 101-2 verifies that the new storage area exists, that the new storage area has been properly initialized (e.g., not corrupted, etc.), that the appropriate permissions (e.g., read, write, etc.) are in place, and that the new storage area's predecessor (e.g., stored in the initialization, etc.) is the current area prior to using the snapshot. It should be noted that the storing of the reference in the local data store is optional, and may be omitted in some other examples.

At block 303, computer system 101-2 uses the prepared snapshot (e.g., creates a new virtual disk from the snapshots, creates a clone of virtual machine 130-1, copies the snapshot to another storage device, computes a difference between the snapshot and a disk image, etc.) using the reference. In one example, block 303 is performed by snapshot manager 128-2.

Figure 4:
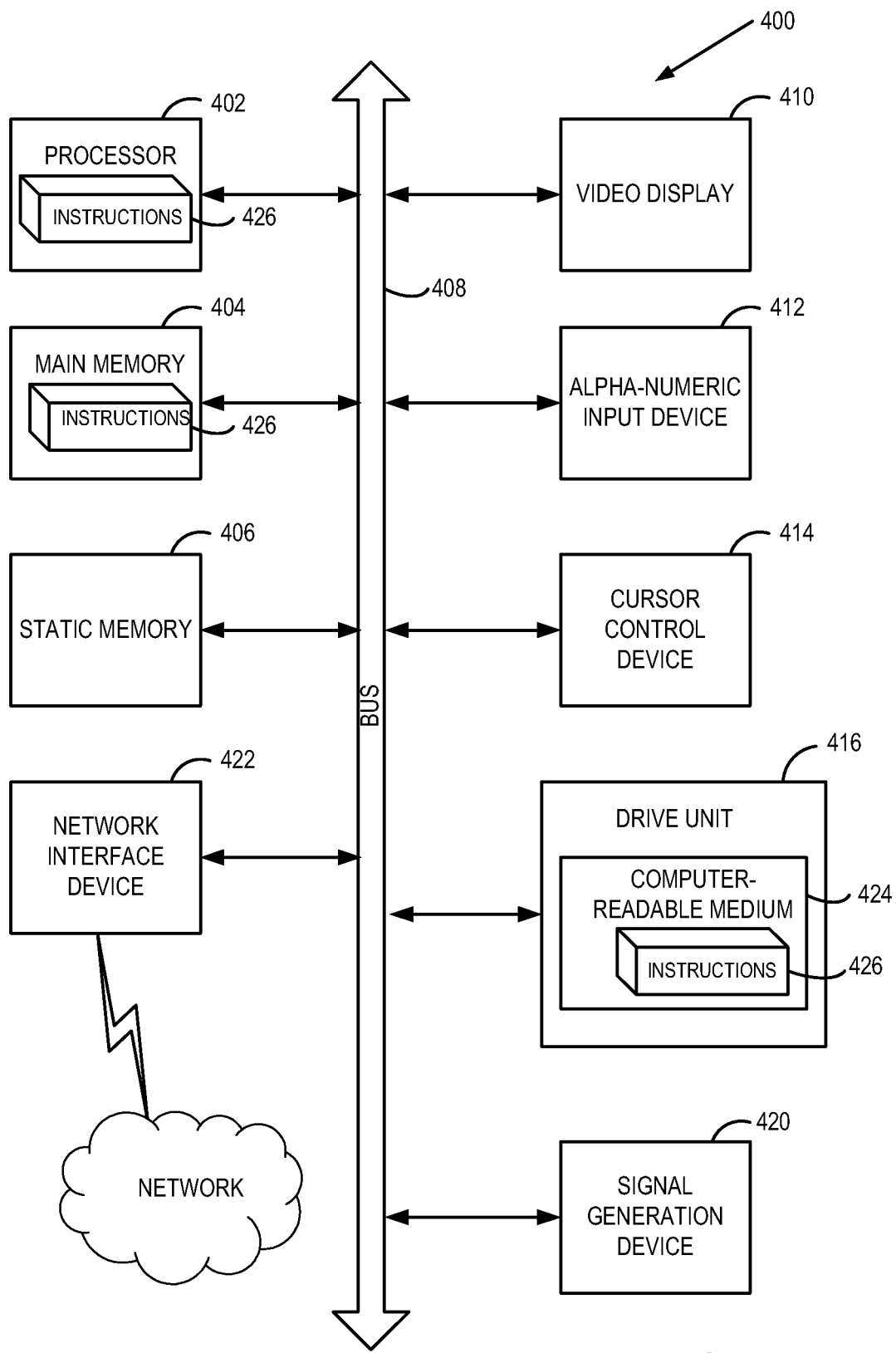
FIG. 4 depicts a block diagram of an illustrative computer system operating in accordance with examples of the invention.

FIG. 4 illustrates an illustrative computer system within which a set of instructions, for causing the machine to perform any one or more of the methodologies discussed herein, may be executed. In alternative examples, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The illustrative computer system 400 includes a processing system (processor) 402, a main memory 404 (e.g., read-only memory (ROM), flash memory, dynamic random access memory (DRAM) such as synchronous DRAM (SDRAM)), a static memory 406 (e.g., flash memory, static random access memory (SRAM)), and a data storage device 416, which communicate with each other via a bus 408.

Processor 402 represents one or more general-purpose processing devices such as a microprocessor, central processing unit, or the like. More particularly, the processor 402 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 402 may also be one or more special-purpose processing devices such as an application specific integrated circuit (ASIC), a field programmable gate array (FPGA), a digital signal processor (DSP), network processor, or the like. The processor 402 is configured to execute instructions 426 for performing the operations and steps discussed herein.

The computer system 400 may further include a network interface device 422. The computer system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 420 (e.g., a speaker).

The data storage device 416 may include a computer-readable medium 424 on which is stored one or more sets of instructions 426 (e.g., instructions corresponding to the methods of FIGS. 2 and 3, etc.) embodying any one or more of the methodologies or functions described herein. Instructions 426 may also reside, completely or at least partially, within the main memory 404 and/or within the processor 402 during execution thereof by the computer system 400, the main memory 404 and the processor 402 also constituting computer-readable media. Instructions 426 may further be transmitted or received over a network via the network interface device 422.

While the computer-readable storage medium 424 is shown in an illustrative example to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

Although the operations of the methods herein are shown and described in a particular order, the order of the operations of each method may be altered so that certain operations may be performed in an inverse order or so that certain operation may be performed, at least in part, concurrently with other operations. In another example, instructions or sub-operations of distinct operations may be in an intermittent and/or alternating manner.

In the foregoing description, numerous details have been set forth. It will be apparent, however, to one skilled in the art, that embodiments of the present disclosure may be practiced without these specific details. In some instances, well-known structures and devices are shown in block diagram form, rather than in detail, in order to avoid obscuring the present disclosure.

Some portions of the detailed descriptions are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the foregoing discussion, it is appreciated that throughout the description, discussions utilizing terms such as "preparing", "providing", "receiving", "running", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general purpose systems may be used with programs in accordance with the teachings herein, or it may prove convenient to construct more specialized apparatus to perform the required method steps. In addition, embodiments of the present disclosure are not described with reference to any particular programming language. It will be appreciated that a variety of programming languages may be used to implement the teachings of the disclosure as described herein.

Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus. Embodiments of the present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., carrier waves, infrared signals, digital signals, etc.)), etc.

It is to be understood that the above description is intended to be illustrative, and not restrictive. Many other examples will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
    creating in an area of a storage device, by a first processor, a snapshot of a virtual disk of a virtual machine that is hosted by a second processor; and
    providing to the second processor, by the first processor, a reference to the created snapshot.

2. The method of claim 1 further comprising allocating the area of the storage device.

3. The method of claim 1 further comprising initializing the area of the storage device.

4. The method of claim 3 wherein the area of the storage device is initialized with a header of the snapshot.

5. The method of claim 1 wherein the providing of the reference to the second processor enables the second processor to use the created snapshot.

6. The method of claim 1 wherein the virtual machine writes data from the virtual disk to a first volume, and wherein the area of the storage device belongs to a second volume.

7. The method of claim 1 wherein the virtual machine is stored in a first volume, and wherein the area of the storage device belongs to a second volume.

8. The method of claim 1 wherein the virtual machine is stored on a different storage device than the snapshot.

9. A non-transitory computer readable storage medium, having instructions stored therein, which when executed, cause a first processor to:
    run, by the first processor, a virtual machine; and
    use, by the first processor, a snapshot of a virtual disk of the virtual machine that is created by a second processor.

10. The non-transitory computer readable storage medium of claim 9, wherein the first processor is further to receive a reference to the snapshot from the second processor.

11. The non-transitory computer readable storage medium of claim 9, wherein the first processor and the second processor belong to a cluster.

12. The non-transitory computer readable storage medium of claim 9, wherein the snapshot is created in a first volume, and wherein the virtual machine writes data from the virtual disk to a second volume.

13. The non-transitory computer readable storage medium of claim 12, wherein the first volume resides on a first storage device and the second volume resides on a second storage device.

14. The non-transitory computer readable storage medium of claim 9, wherein the snapshot is created in a first volume, and wherein the virtual machine is stored in a second volume.

15. The non-transitory computer readable storage medium of claim 14, wherein the first volume resides on a first storage device and the second volume resides on a second storage device.

16. An apparatus comprising:
    a first processor to host a virtual machine; and
    a second processor to:
        create, in an area of a storage device, a snapshot of a virtual disk of the virtual machine, and
        provide to the first processor a reference to the created snapshot.

17. The apparatus of claim 16 wherein the first processor is further to use the created snapshot after being provided with the reference.

18. The apparatus of claim 16 wherein the first processor and the second processor belong to a cluster.

19. The apparatus of claim 16 further comprising the storage device.

20. The apparatus of claim 16 wherein the virtual machine to write data from the virtual disk to a first volume, and wherein the area of the storage device belongs to a second volume.

* * * * *